June 17, 1958     G. M. TRINITE, JR     2,839,689
SUNFOLLOWER
Filed Feb. 2, 1954     3 Sheets-Sheet 1
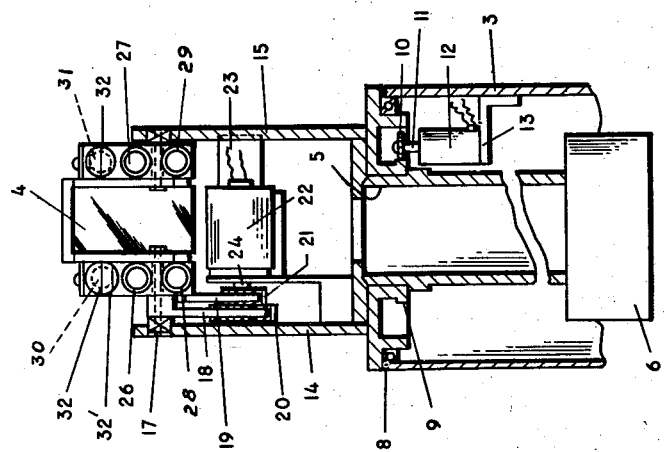
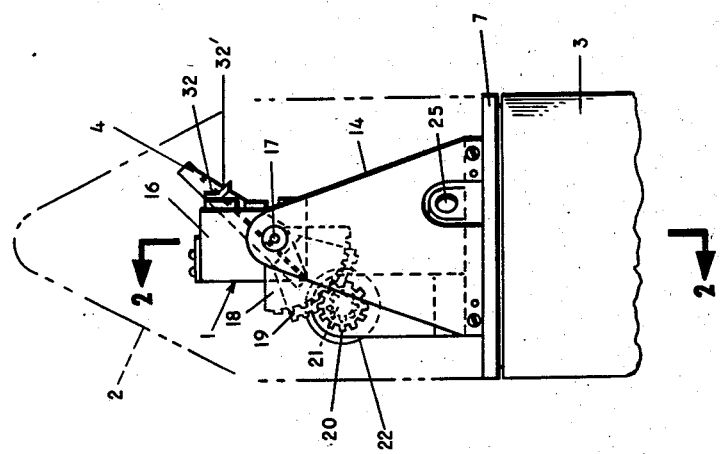
INVENTOR.
GEORGE M. TRINITE, JR.
BY INVENTOR.
GEORGE M. TRINITE, JR.
BY
Billy G. Corben

United States Patent Office 2,839,689
Patented June 17, 1958

2,839,689

SUNFOLLOWER

George M. Trinite, Jr., Baltimore, Md., assignor to Aircraft Armaments, Inc., Baltimore, Md., a corporation of Maryland Application February 2, 1954, Serial No. 407,789

9 Claims. (Cl. 250—203)

This invention relates generally to guidance systems of the type which may be used to guide a vehicle, such as a missile or rocket, along a path relative to a reference point fixed in space, and more particularly to a sunfollower employing a plurality of light sensitive photoelectric cells for maintaining the reflected image of the sun in a constant position relative to the vehicle carrying the sunfollower irrespective of the movement thereof. Certain of the plurality of photoelectric cells in the sunfollower are of the sensitive type which have a large change in response to small angular aiming errors, while other of the plurality of photoelectric cells are relatively insensitive to small angular deviations but are responsive to light over a wide sight angle as compared with the sight angle of the sensitive photoelectric cells. The sensitive photoelectric cells are termed "fine eyes" and the relatively insensitive photoelectric cells are termed "coarse eyes" in the detailed description which follows. The fine and coarse eyes are incorporated in a selective circuit which allows only the fine eyes to function when the system is aimed on or very near the sun. In this manner the coarse eye photoelectric cells which are responsive to light over a wide area or field of vision are prevented from interfering with the accuracy of the system due to light reflected from clouds or other bright objects.

An object of this invention is to provide a sunfollower which will seek out the sun from any position in space and "lock on" the sun as a target with a high degree of accuracy and dependability, even though the vehicle carrying the sunfollower moves along a path other than towards the sun.

Another object of this invention is to provide a selective photoelectric cell circuit wherein the coarse eye photo cells are not allowed to function when the sunfollower is closely tracking the sun whereby the control system is made insensitive to stray light sources.

Another object of this invention is to provide a sunfollower for directing light rays from the sun to a recording device within a rocket, even though the rocket moves along a completely independent path relative to the sun.

Further and other objects will become apparent from a reading of the following description, especially when considered in combination with the accompanying drawing wherein like numerals refer to like parts.

In the drawing:

Figure 1 is a side elevational view of the sunfollower shown mounted within the nose portion of a rocket.

Figure 2 is a fragmentary sectional view taken approximately on line 2—2 of Figure 1.

Figure 3:
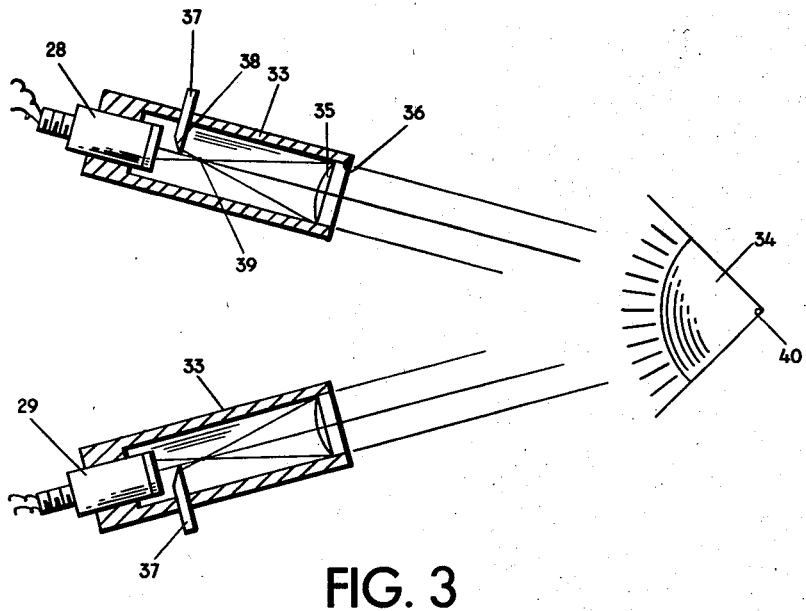
Figure 3 is a view showing a pair of fine eye photoelectric cells, illustrating the manner in which the directional sensitivity of the sunfollower is obtained.

Referring to Figures 1 and 2, sunfollower 1 is shown mounted in the nose 2 of a rocket 3 which is adapted to be launched and directed upwardly to very high altitudes for obtaining scientific information concerning the sun and upper atmosphere. A mirror 4 carried by sunfollower 1 is positioned by the sunfollower so as to always direct the reflection of the sun through an opening 5 on the longitudinal axis of the rocket whereby suitable recording apparatus 6 may receive the reflection to obtain the desired information and store it for future studies after the rocket has returned to earth. The mechanical mechanism by which mirror 4 is maintained in the proper position relative to the sun, irrespective of the direction of movement of rocket 1, is shown by Figures 1 and 2, wherein sunfollower 1 is mounted on a turntable 7 arranged transversely of the longitudinal axis of the rocket and suitably carried by bearings 8 for rotation relative to the rocket housing. Turntable 7 is provided with an annular ring gear 9 which operatively engages a pinion 10 carried by shaft 11 of a phase sensitive azimuth drive motor 12. Drive motor 12 is suitably rigidly carried by rocket 1 through bracket 13. By controlling the operation of azimuth drive motor 12, turntable 7 may be moved relative to the rocket as required to properly position mirror 4 in azimuth.

A pair of brackets 14 and 15 rigidly secured to turntable 7 and arranged generally parallel to each other and to the longitudinal axis of rocket 1 project forwardly of the turntable into the nose portion 2 of the rocket for swingably supporting mirror 4 and a photoelectric cell head 16 through shaft 17. Photoelectric cell head 16 is rotatable relative to shaft 17, while mirror 4 is rigidly secured to the shaft. Head 16 moves in azimuth with mirror 4 as directed by azimuth drive motor 12. Elevation movement of mirror 4 is controlled independently of the elevation movement of head 16 by a sector gear 18 rigidly secured to shaft 17, as shown in Figures 1 and 2, so that by rotating the sector gear about shaft 17 mirror 4 is caused to swing in elevation. A second sector gear 19 is fixedly attached to photoelectric cell head 16 for independently controlling the movement thereof relative to mirror 4. This independent movement of head 16 and mirror 4 is necessitated for the elevation movement because the elevation angle changes considerably while tracking the sun. The changes in the angles of incidence and reflection of light rays striking a mirror add together, requiring moving the mirror in elevation only one-half as far as it is required to move head 16 in order to maintain the proper line-of-sight angle to the sun. That is, the change in the angle which the mirror makes relative to the longitudinal axis of rocket 1 in order to always direct the reflection of the sun through opening 5 in turntable 7 is only one-half the change in the elevation angle required by head 16 in order to provide a line-of-sight to the sun. Sector gears 18 and 19 operatively engage drive gears 20 and 21 respectively. Gears 20 and 21 have a two-to-one gear ratio so that rotational movement of the drive gears may be effected by the same shaft and still produce the proper elevation movement of photoelectric cell head 16 and mirror 4. A phase sensitive elevation drive motor 22, rigidly carried by brackets 14 and 15 through suitable support members 23, connects with gears 20 and 21 through armature shaft 24. By controlling the operation of motor 22, the desired elevation movement is obtained.

Control voltages for operating azimuth drive motor 12 and elevation drive motor 22 are obtained by use of a plurality of pairs of photoelectric cells forming a part of a sunfollower 1 and arranged on photoelectric cell head 16 and on turntable 7, as shown in Figures 1 and 2. A pair of azimuth coarse eye photoelectric cells 25, one on either side of the rocket, are mounted on turntable 7 at the base of brackets 14 and 15. These coarse eye cells are responsive to light directed from any point in space. One of the coarse eyes 25 covers a sector in azimuth of 180° on one side of the rocket, while the other coarse eye covers the remaining 180° azimuth sector. A pair of azimuth fine eye photoelectric cells 26 and 27 are mounted on photoelectric cell head 16 for responding to light received within a relatively narrow azimuth range of, for example, 40°. The azimuth fine eye photoelectric cells, unlike the azimuth coarse eye cells 25, are quite sensitive to changes in aiming error, allowing the sunfollower to sense azimuth errors of one or two degrees when the sunfollower is aimed approximately at the sun. Both the elevation fine eyes 28 and 29 and elevation coarse eyes 30 and 31 are mounted on head 16 along with azimuth fine eyes 26 and 27. Elevation coarse eyes 30 and 31 are responsive to light directed from any point which is within a 180° segment in front of the eyes. Elevation fine eyes 28 and 29 are responsive to light within a relatively narrow elevation range of, for example, 40°.

In order to obtain directional sensitivity of the elevation coarse eyes, light blinders 32 are mounted on head 16 in front of each elevation coarse eye photoelectric cell. Blinder 32 for elevation coarse eye 30 is arranged to block light coming from the upper half of the 180° segment so that the eye will be responsive to only such light as is directed from a source within the lower half of the 180° segment covered by the elevation coarse eyes. Blinder 32 for coarse eye photoelectric cell 31 blocks all light coming from the lower half of the 180° segment, whereby the cell will be responsive to only such light as is directed from a source located within the upper half of the segment. The actual shape of the elevation coarse eye blinders 32 is best shown in Figure 1, wherein a reflector 32′ on the blinder projects outwardly at an angle of approximately 45° so that at a zero error aiming angle the photoelectric cell 30 or 31 receives no light and as the aiming error angle increases, the quantity of light received by the photoelectric cell increases to a maximum at an aiming error angle of slightly under 90°, as indicated by curve 43 in Figure 5.

Azimuth coarse eye cells 25 do not require the use of blinders since the physical arrangement thereof allows the rocket structure itself to serve as a blinder to prevent light received by one of the cells from also being received by the other.

The manner in which directional sensitivity is obtained for both pairs of elevation and azimuth fine eye photoelectric cells is shown in Figure 3. A tubular member 33, adapted to be carried by head 16, is arranged to receive light rays from the sun 34 and project those rays onto the light sensitive portion of a photoelectric cell, such as fine eye cell 28 or 29. A meniscus lens 35 is carried within the tubular member 33, adjacent the forward end 36 thereof, for focusing the sun's rays within tube 33 to provide a focal plane which is in front of the light sensitive photoelectric cell. A baffle 37 projects transversely into hollow tubular member 33 between the focal plane of lens 36 and photoelectric cell 28. Baffle 37 is provided with a straight knife edge 38 which bisects the tubular guide and closes half the opening therein so that when photoelectric cell 28 is aimed directly towards the sun 34, half the light energy from the sun which is received within tubular member 33 is applied to photoelectric cell 28 and the other half of the light energy is blocked off by baffle 37. Should the photoelectric cell be aimed slightly off the direct line-of-sight to the sun, focal point 39 will be caused to move a proportional amount from the axially arranged position shown in Figure 3 so that more than half the light or less than half the light will be allowed to strike the photoelectric cell, depending upon the direction of the aiming error.

As indicated in Figure 3, the fine eye cells function in pairs and baffles 37 project into tubular members 33 on opposite sides thereof so that one cell receives the upper portion of its light beam, while the other cell receives the lower portion of its light beam. When the pair of photoelectric cells are both aimed directly towards the sun, the amount of light energy applied to one of the pair of cells is equal to the amount of energy applied to the other of the pair of cells. If the elevation fine eye photoelectric cells, which are shown in Figure 3, aim above the sun, photoelectric cell 28 will receive more light than photoelectric cell 29, with the result that a larger voltage will be produced by photoelectric cell 28. If the elevation fine eye photoelectric cells are aimed below the sun, photoelectric cell 29 will produce the greater voltage. In this manner the direction of the sunfollower aiming error is detected. While the fine eye cells 28 and 29 are shown as being angularly related to one another so that their axes will intersect at the apex 40 of the light source or sun 34, it is merely to illustrate the operation of the fine eyes. Actually, since the sun is considered as a point source of light located at infinity, the fine eye cells 28 and 29 should be, and are in the actual system, arranged parallel to one another so that their axes will intersect at infinity as required to produce voltage outputs in the manner described above. The azimuth fine eye photoelectric cells function in the same manner to provide directional sensitivity.

Figure 5:
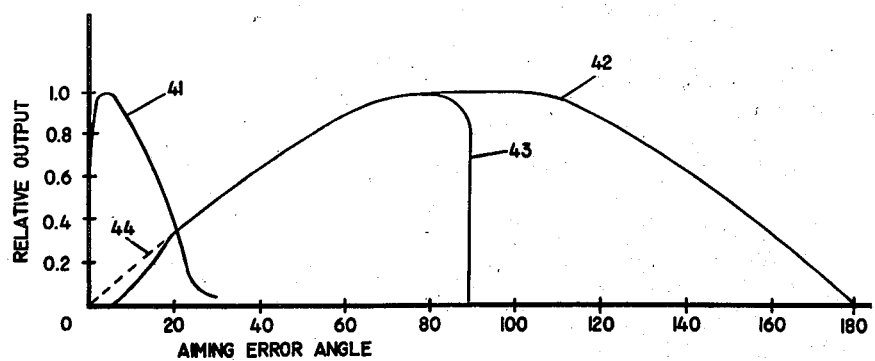
Figure 5 is a graphical representation illustrating the relative voltage output from the fine and coarse eye photoelectric cells as the aiming error angle increases from a zero error position.

The output voltages of the photoelectric cells vary with the aiming error approximately as shown in Figure 5. Curve 41 represents the output of the fine eye photoelectric cells as they are moved from the zero error position relative to the sun to other aiming positions relative to the sun within the operating range of the fine eye. Curve 42 represents the voltage output from the azimuth coarse eyes from a zero error position relative to the sun to a 180° error position. Curve 43 shows the voltage variation of the elevation coarse eyes from a zero error position to a 90° error position. The outputs from the elevation and azimuth coarse eye cells are the same up to an angular error of approximately 80° when the two curves separate, and curve 43 for the elevation coarse eyes drops off to a zero output at an aiming error of approximately 90°. This difference between curves 42 and 43 is a result of the different manner in which the coarse eye photoelectric cells are shielded from light rays on the mechanical structure, as shown in Figures 1 and 2.

As is apparent from Figure 5, the relative output of the fine eye photoelectric cells, when they are in the zero error position, is approximately half the maximum fine eye photoelectric cell output; and as an aiming error is introduced, the relative output increases to a maximum at an aiming error of approximately 2°. As the aiming error increases beyond the 2° point, the relative output of the fine eye photoelectric cell decreases rapidly; and at an aiming error of approximately 30°, the relative output is substantially zero. It is therefore apparent that the fine eye photoelectric cells are useful for aiming the sunfollower only when the directional error is somewhat less than 30° on either side of the sun.

The coarse eye photoelectric cell outputs at aiming positions near the sun would normally follow the broken line 44 shown in Figure 5 so as to produce an output voltage up until the zero error position is reached. However, through the use of the selective photoelectric cell circuit shown in Figure 4, curves 42 and 43 are modified as shown in Figure 5 so that operation of the coarse eye cells does not begin until an aiming error of approximately 5° is present. This modification of the relative output curve for the coarse eye photoelectric cells is important to produce a stable and dependable sunfollower which will closely track the sun, since the coarse eyes are responsive to light directed from sources located anywhere within a hemisphere in the case of the elevation coarse eyes and anywhere within a sphere in the case of the azimuth coarse eyes. This wide angle of vision of the coarse eye photoelectric cells allows light reflections from clouds and bright objects to materially affect the coarse eye outputs. If the coarse eye photoelectric cells were operative to control the sunfollower drive motors 12 and 22 when the aiming error was within 5° on either side of the sun, they could introduce false aiming errors due to reflections, causing the sunfollower to oscillate on and off the sun and prevent the recording apparatus from obtaining reliable data.

Figure 4:
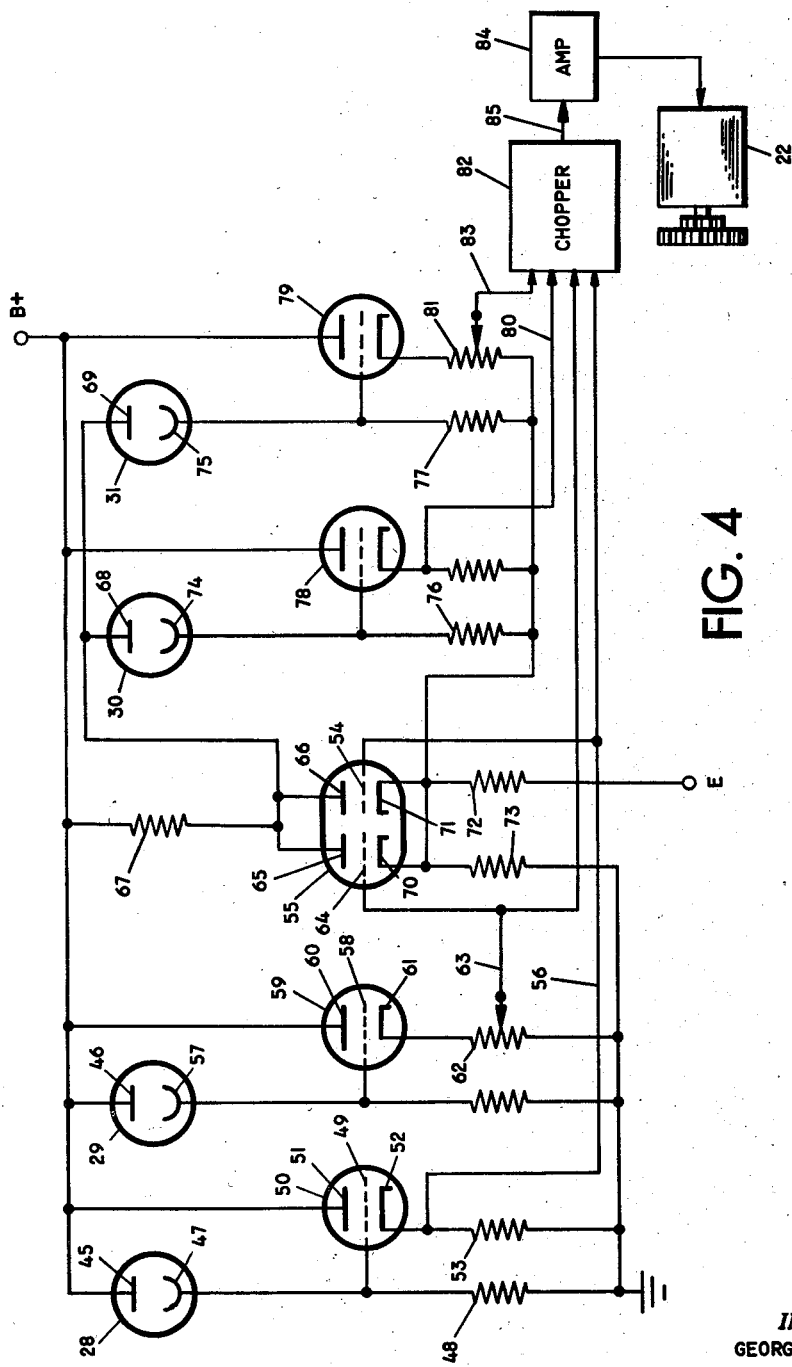
Figure 4 is a schematic circuit diagram showing the electronic control circuit employed in the sunfollower.

Figure 4 shows the photoelectric cell circuit for controlling elevation drive motor 22. An identical circuit is employed to control azimuth drive motor 12; however, since both the elevation and azimuth control circuits are alike, only the elevation control circuit is shown. In order to more clearly describe the manner in which the selective circuit shown in Figure 4 operates, photoelectric cells 28 and 30 are designated as "down" cells wherein the outputs generated by these two photoelectric cells cause elevation drive motor 22 to operate so as to rotate head 16 clockwise, as viewed in Figure 1. Photoelectric cells 29 and 31 are designated "up" cells wherein their outputs cause elevation drive motor 22 to operate in a reverse direction and drive head 16 in a counterclockwise direction, as viewed in Figure 1. Anodes 45 and 46 of the elevation fine eye photoelectric cells connect directly with a suitable source of electric potential, identified in Figure 4 as B+. Cathode 47 of the fine eye down cell 28 is connected to ground through a resistor 48 and also to the grid 49 of a conventional triode vacuum tube 50 serving as a cathode follower. Cathode 52 of triode 50 connects with ground through resistor 53 and also to one grid 54 of a double triode switch tube 55 through lead 56. Cathode 57 of the fine eye up cell 29 connects with ground and with grid 58 of a second triode cathode follower 59 in a manner similar to the circuit just described in connection with the fine eye down cell 28. Anode 60 of the second cathode follower 59 connects with B+, while cathode 61 connects with ground through a balancing potentiometer 62. Output lead 63 of potentiometer 62 connects with the second grid 64 of double triode switch tube 55. Anodes 65 and 66 of switch tube 55 connect with B+ through a plate load resistor 67 and to anodes 68 and 69 of the coarse eye down and up cells 30 and 31, respectively. Cathodes 70 and 71 of switch tube 55 connect with a low positive potential source designated as "E" through a resistor 72 and to ground through a resistor 73.

The voltage outputs from the fine eye photoelectric cells 28 and 29 are amplified by the cathode followers 50 and 59 and applied to grids 54 and 64 of switch tube 55 to control the flow of current through the switch tube. For example, when the fine eye down cell 28 is operating to produce an output voltage of sufficient magnitude, a biasing voltage is applied to grid 54 on the right side of switch tube 55 which allows current flow from anode 66 to cathode 71; but when fine eye down cell 28 is not operating to produce an output greater than the cutoff biasing voltage for grid 54, the right side of switch tube 55 is prevented from conducting. The left side of switch tube 55 is regulated by fine eye up cell 29 in a similar manner to allow current flow between anode 65 and cathode 70 only when the output of photoelectric cell 29 is sufficient to raise the biasing voltage applied to grid 64 above the cutoff value. When current is flowing in either half of switch tube 55, the anode voltages at the coarse eye down and up cells 30 and 31 are thereby lowered to a value sufficient to prevent the coarse eyes from operating.

Cathodes 74 and 75 of coarse eye down and up cells 30 and 31, respectively, connect with E through resistors 76 and 77 and with cathode followers 78 and 79 in the same manner that the fine eye cells 28 and 29 connect with their cathode followers. By connecting the cathodes of the coarse eye photoelectric cells with E rather than with ground, a suitable positive potential is applied thereto, rendering the coarse eye photoelectric cells inoperative at a higher anode voltage than would otherwise be the case. Thus, when switch tube 55 is conducting, the coarse eye anode voltages are lowered sufficiently to render the coarse eyes inoperative.

The output voltages from the fine and coarse eye down cells 28 and 30 are obtained directly from the cathodes of the cathode followers 50 and 78, respectively, through leads 56 and 80. The output voltages from the fine and coarse eye up cells 29 and 31 are obtained from potentiometers 62 and 81, respectively, which are located in the cathode circuit of cathode followers 59 and 79. Potentiometers 62 and 81 are employed in the circuit for balancing the output voltages from the fine eyes and the output voltages from the coarse eyes, respectively, so that the voltage outputs for a zero error angle will be the same. The output voltages from the photoelectric cell circuit are applied to a chopper 82 through leads 56, 63, 80 and 83. Chopper 82 is of the conventional type wherein the direct current voltages applied thereto are converted to an alternating current having a phase determined by the direct current voltages from the up and down photoelectric cells in the circuit. The alternating current output from chopper 82 is applied to an amplifier 84 through lead 85. The alternating current voltage is amplified in amplifier 84 and then applied to elevation drive motor 22, as indicated in Figure 4, to control the operation thereof. Azimuth drive motor 16 is controlled by the azimuth photoelectric cells in a similar manner. The direction of rotation of the output shafts of motors 16 and 22 is determined by the phase of the applied voltages, and by this means photoelectric cell head 16 is caused to move such that the fine eye photoelectric cells will aim directly towards the sun irrespective of the movement of the vehicle carrying the sunfollower and hence maintain mirror 4 in the proper position.

In operation, starting with the sunfollower having large azimuth and elevation aiming errors, one of the azimuth coarse eye photoelectric cells 25 receives light rays emitted by the sun and in response thereto generates an output voltage causing sunfollower 1 to rotate in azimuth by the operation of azimuth drive motor 12 to reduce the sunfollower azimuth aiming error. As soon as the azimuth aiming error reaches 90°, elevation coarse eye photoelectric cells 28 and 29 begin operating to produce an output voltage driving elevation motor 22 to reduce the elevation aiming error. When the aiming errors are reduced to approximately 30° in both elevation and azimuth, the fine eye photoelectric cells begin to receive light rays from the sun and produce an output voltage which adds with the output voltage of the coarse eye photoelectric cells to further reduce the sunfollower aiming error. As indicated in Figure 5, when the aiming error is approximately 17° in either azimuth or elevation, the fine eye photoelectric cell associated with the particular azimuth or elevation selective circuit produces an output voltage which is sufficient to start its switch tube 55 conducting. By the time the aiming error of the sunfollower has been reduced to approximately 5°, the fine eye photoelectric cell output voltage will have reached a magnitude sufficient to cause switch tube 55 to fully conduct. This causes a reduction in the voltage at the anodes of the coarse eye photoelectric cells which is sufficient to render them inoperative and non-responsive to light rays received from the sun or other sources. This is most clearly illustrated in Figure 5, wherein curves 42 and 43 reach zero when the angle of incidence or aiming error of the sunfollower is approximately 5°. The voltage outputs from the fine eye photoelectric cells continue to drive motors 16 and 22 to reduce the aiming error to substantially zero. Within the 5° aiming error range, the fine eye cells have exclusive control of the drive motor. With a zero aiming error, the outputs from the fine eye photoelectric cells are equal to each other and are effectively cancelled in chopper 82 such that its output through lead 85 will be zero, indicating that the sunfollower is properly aimed towards the sun such that mirror 4 will properly reflect the sun's image through opening 5 and into the recording apparatus 6 shown in Figure 2.

Since the coarse eyes are rendered inoperative within the 5° error position on either side of the sun, light reflections from clouds and other objects in space are not allowed to affect the sunfollower control system once the sunfollower has been moved to the approximate proper tracking position. Yet, when the tracking errors exceed 5°, the coarse eye photoelectric cells are allowed to begin operating and assist the fine eye photoelectric cells in reducing the tracking error. With this arrangement the sunfollower will dependably track the sun, even though conditions may temporarily impose very large aiming errors on the system.

Obviously, the aiming error angle at which the coarse eye photoelectric cells are rendered inoperative may be changed as desired to suit any particular application by changing either the voltage at the coarse eye cathodes or the size of the resistors in the anode circuits of the switch tubes.

While the sunfollower has been described in connection with a device on a rocket for controlling the position of a mirror for use in recording scientific information relating to the sun, it is believed obvious that the photoelectric cell circuit described herein is applicable for controlling the movement of any body relative to the sun or other light source; and it is therefore to be understood that this, as well as other alterations, modifications and substitutions, may be made to the instant disclosure without departing from the teachings of this invention as defined by the appended claims.

I claim:

1. A sunfollower for tracking the sun and controlling the movement of a body relative thereto comprising, a plurality of coarse-eye photoelectric cells mounted on said body and responsive to light rays over a wide sector of space to produce an output voltage proportional to the energy of the light rays received by the coarse-eye cells, a plurality of fine-eye photoelectric cells mounted on said body and responsive to light rays within a relatively narrow sector of space located within said wide sector to produce an output voltage proportional to the energy of the light rays received by the fine-eye cells, a normally inoperative electronic valve responsive to the outputs from said fine-eye photoelectric cells to allow current flow through said valve, said coarse-eye photoelectric cells connecting with said electronic valve and being responsive to current flow therethrough to be varied in light responsiveness in proportion to variations in said current flow, whereby said fine-eye photoelectric cells alone operate to provide output voltages while the sunfollower is closely tracking the sun, and drive means responsive to the output voltages from said photoelectric cells for directing the movement of the body relative to the sun.

2. A selective photoelectric cell circuit comprising, a pair of photoelectric cells, each said cell having an anode and a cathode, an electronic switch tube having an anode, a cathode and a grid, the cathode of one of said photoelectric cells connecting with the grid of said switch tube, the anode of the other of said photoelectric cells connecting with the anode of said switch tube, a source of electrical potential connecting with the anodes of said photoelectric cells and switch tube, an impedance interposed between the source of electrical potential and the anodes of said switch tube and said other photoelectric cell whereby current flow through said switch tube lowers the applied voltage on the anode of said other photoelectric cell relative to said source of electrical potential, and a low potential source connecting with the cathode of said switch tube for loading the same to allow current flow through said switch tube only when said one photoelectric cell produces an output voltage exceeding the cutoff voltage on the grid of said switch tube, the cathode of said other photoelectric cell connecting with said low potential source to provide a cathode voltage allowing operation of said other photoelectric cell only when the output voltage of said one photoelectric cell is below the cutoff voltage on the grid of said switch tube.

3. A device for tracking a light source comprising, a frame, a plurality of fine and coarse eye photoelectric cells carried by said frame for pivotal movement relative thereto, drive means carried by said frame and responsive to said photoelectric cells for positioning the latter to aim at said light source, a source of electrical potential, said coarse eye photoelectric cells being normally responsive to light rays directed from any position within a wide sector of space to produce an output voltage proportional to the quantity of the light received thereby, said fine eye photoelectric cells being responsive to only such light rays as are directed from positions within a relatively narrow sector of space to produce an output voltage proportional to the quantity of the light received thereby, and an electron switch tube having the output thereof connected with said coarse eye photoelectric cells for retarding the operation thereof only when current is flowing in said electron switch tube; the output of said fine eye photoelectric cells connecting with said switch tube and biasing said tube to allow current flow therethrough only when the fine eye output voltage is above a predetermined magnitude whereby said coarse eye photoelectric cells are rendered ineffective for controlling said drive means when the device is closely tracking said light source.

4. A device for tracking a light source comprising, a frame, a plurality of fine and coarse eye photoelectric cells carried by said frame and arranged for swinging movement relative thereto, drive means carried by said frame and responsive to said photoelectric cells for positioning the latter relative to said light source for tracking, said coarse eye photoelectric cells being normally responsive to light rays directed from any position within a wide sector of space to produce an output voltage proportional to the quantity of the light received thereby, said fine eye photoelectric cells being responsive to only such light rays as are directed from positions within a relatively narrow sector of space to produce an output voltage proportional to the quantity of the light received thereby, and switch means connecting with said coarse eye photoelectric cells and responsive to an output voltage of predetermined magnitude from said fine eye photoelectric cells for actuation to render said coarse eye photoelectric cells inoperative only so long as the output voltage from said fine eye photoelectric cells remain above said predetermined magnitude.

5. A selective photoelectric cell circuit comprising, a pair of photoelectric cells for generating control voltages in response to light energy, each said cell having an anode and a cathode, an electronic switch tube having an anode, a cathode and a grid, the cathode of one of said photoelectric cells connecting with the grid of said switch tube, the anode of the other of said photoelectric cells connecting with the anode of said switch tube, a source of electrical potential connecting with the anodes of said photoelectric cells and switch tube, and a load resistor interposed between the source of electrical potential and the anodes of said switch tube and said other photoelectric cell whereby current flow through said switch tube sufficiently lowers the applied voltage at the anode of said other photoelectric cell to render the same inoperative, said switch tube being operative to allow current flow therethrough only in response to a grid voltage supplied by the cathode of said one photoelectric cell which is greater in magnitude than the cutoff voltage for the grid of said switch tube.

6. A device for tracking a light source and controlling the movement of a body relative thereto comprising, a frame, a turntable rotatably carried by said frame, a photoelectric cell head swingably carried by said turntable for movement about an axis perpendicular to the axis of rotation of said turntable, a plurality of coarse and fine eye photoelectric cells carried by said head, drive means carried by said frame and turntable for positioning said head to aim said fine eye photoelectric cells at the light source, the coarse eye photoelectric cells being normally responsive to light rays directed from any position within a wide sector of space to produce an output voltage directly proportional to the quantity of light received thereby, the fine eye photoelectric cells being responsive to only such light rays as are directed from positions within a relatively narrow sector of space to produce an output voltage directly proportional to the quantity of light received thereby, means responsive to the output voltages from said fine and coarse eye photoelectric cells and connecting with said drive means for controlling the operation thereof to aim said fine eye photoelectric cells at said light source, and switch means connecting with said coarse eye photoelectric cells and responsive to an output voltage of predetermined magnitude from said fine eye photoelectric cells for actuation to render said coarse eye photoelectric cells inoperative so long as the output voltage from said fine eye photoelectric cells remains above said predetermined magnitude.

7. A light sensitive device for detecting the relative movement of a light source comprising, a frame, a coarse eye photoelectric cell carried by said frame and normally responsive to light rays directed from any position within a wide sector of space to produce an output voltage proportional to the quantity of light received thereby, a fine eye photoelectric cell carried by said frame and responsive to light rays directed from positions within a relatively narrow sector of space to produce an output voltage proportional to the quantity of light received thereby, and switch means connecting with said coarse eye photoelectric cell and responsive to an output voltage of predetermined magnitude from said fine eye photoelectric cell for actuation to render said coarse eye photoelectric cell conductive for only so long as the output voltage from said fine eye photoelectric cell remains below said predetermined magnitude.

8. A light sensitive device for detecting the relative movement of a light source comprising, support means, a pair of photoelectric cells carried by said support means and responsive to light rays directed from any position within a given sector of space to produce output voltages proportional to the quantity of light thereby received, and switch means connecting with one of said pair of photoelectric cells and responsive to an output voltage of predetermined magnitude from the other of said pair of photoelectric cells for actuation to render the one photoelectric cell conductive to an electric current for only so long as the output voltage from the other photoelectric cell remains below said predetermined magnitude.

9. In a device for tracking a light source and controlling the movement of a body relative thereto, a selective photoelectric cell circuit comprising, a coarse eye photoelectric cell normally responsive to light rays directed from any position within a wide sector of space to produce an output voltage which varies directly with the quantity of light so received, a fine eye photoelectric cell responsive to only such light rays as are directed from positions within a relatively narrow sector of space to produce an output voltage which varies directly with the quantity of light so received, said photoelectric cells each having an anode and a cathode, an electronic switch tube having an anode, a cathode and a grid, the cathode of said fine eye photoelectric cell connecting with the grid of said switch tube, the anode of said coarse eye photoelectric cell connecting with the anode of said switch tube, a source of electrical potential connecting with the anodes of said photoelectric cells and switch tube, a load resistor interposed between the source of electrical potential and the anodes of said switch tube and coarse eye photoelectric cell whereby current flow through said switch tube lowers the applied voltage on the anode of said coarse eye photoelectric cell relative to said source of electrical potential, and means controlling current flow through said switch tube so that current flows through said switch tube only when the output voltage from said fine eye photoelectric cell exceeds a predetermined magnitude whereby the anode voltage of said coarse eye photoelectric cell is lowered sufficiently to render the same inoperative only so long as the fine eye photoelectric cell is aimed to receive a predetermined quantity of light energy from said light source.

References Cited in the file of this patent
UNITED STATES PATENTS
2,421,012    Chew _____ May 27, 1947